United States Patent [19]

Troyer

[11] 4,144,630

[45] Mar. 20, 1979

[54] METHOD OF MAKING TUNED TORSIONAL VISCOUS DAMPERS

[75] Inventor: William J. Troyer, Orchard Park, N.Y.

[73] Assignee: Houdaille Industries, Inc.

[21] Appl. No.: 813,899

[22] Filed: Jul. 8, 1977

Related U.S. Application Data

[62] Division of Ser. No. 705,158, Jul. 14, 1976, Pat. No. 4,046,230.

[51] Int. Cl.² ............................................. B23P 19/00
[52] U.S. Cl. ....................................... 29/436; 29/446; 29/469.5
[58] Field of Search .............. 29/434, 436, 446, 469.5; 74/574; 188/1 B

[56] References Cited

U.S. PATENT DOCUMENTS

| | | | |
|---|---|---|---|
| 3,174,360 | 3/1965 | Katzenberger | 74/574 |
| 3,373,633 | 3/1968 | Desmond et al. | 74/574 |
| 3,410,369 | 11/1968 | Ishizuka | 188/1 B |
| 3,462,136 | 8/1969 | Rumsey | 188/1 B UX |
| 3,640,149 | 2/1972 | McLean | 188/1 B X |
| 3,678,782 | 7/1972 | Aoki | 74/574 |
| 3,992,963 | 11/1976 | Khanna | 188/1 B X |

Primary Examiner—Charlie T. Moon
Attorney, Agent, or Firm—Hill, Gross, Simpson, Van Santen, Steadman, Chiara & Simpson

[57] ABSTRACT

A method of making a tuned torsional viscous damper comprising assembling preformed elastic tuning spring, spacing and sealing rings in engagement about concentricity maintaining shoulder means located at the radially inner sides of grooves substantially wider than the rings within radially inner portions of confronting spaced axially directed faces within a ring shaped inertia mass having a radially inwardly opening annular working chamber, mounting the inertia mass on a supporting disk, including placing within the working chamber and between the rings a radially extending body on the supporting disk, with parallel confronting working surfaces on the body and on said faces in shear film spaced relation having regard to the viscosity of damping medium to be filled into the chamber, bonding the elastic rings to the body and to the inertia mass, and filling viscous damping medium into the chamber. The elastic rings may be placed under axial compression, with expansion of the rings controlled by the concentricity maintaining shoulder means to be in radially outward direction.

10 Claims, 8 Drawing Figures

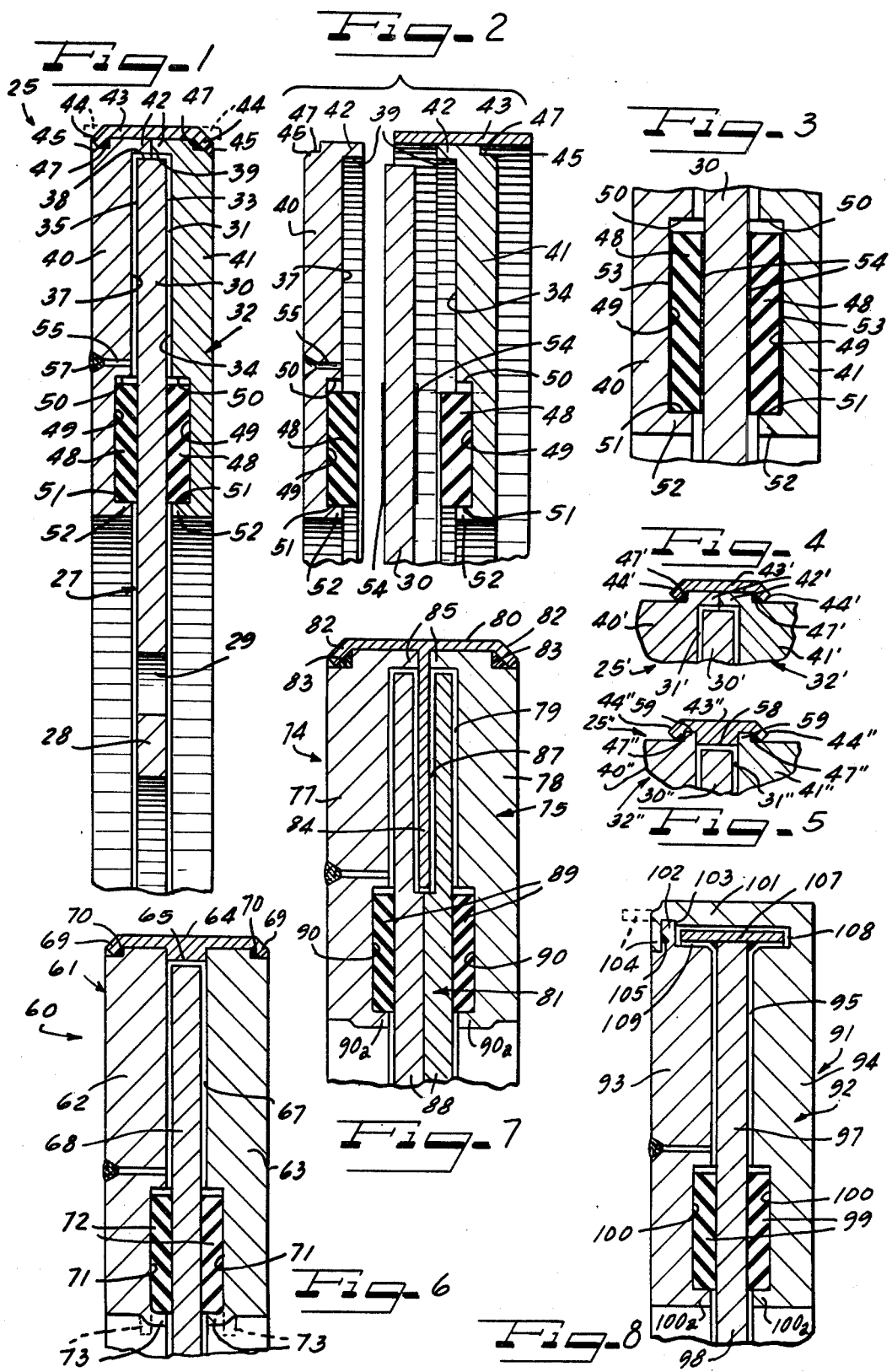

METHOD OF MAKING TUNED TORSIONAL VISCOUS DAMPERS

This is a division, of application Ser. No. 705,158, filed July 14, 1976, now U.S. Pat No. 4,046,230 issued Sept. 6, 1977.

This invention relates generally to improvements in making tuned viscous torsional vibration dampers, and is more particularly concerned with a method of making dampers of this type in which an inertia ring is mounted on a radially extending combination supporting damper disk flange plate and mounting hub.

As is well known in the art, numerous advantages have been experienced with viscous torsional vibration dampers, that is dampers utilizing the phenomenon of resistance to shearing of a thin layer of viscous damping medium such as silicone fluid between relatively moving opposed parallel working surfaces in part corotative with a rotary member such as a crank shaft subject to torsional vibrations and in part carried by an inertia mass relatively torsionally movable with respect to the rotary member to be damped. One desirable form of such dampers comprises a disk-like flange structure having a hub portion to be attached to the rotary member to be damped and a radially extending body portion carrying a ring shaped inertia member having a working chamber enclosing an annular body portion, of the disk flang structure with surfaces of the disk body and the inertia member in shear film spaced relation having regard to the viscosity of the viscous damping medium which is sealed within the chamber by means of elastic sealing rings at the radially inner side of the working chamber. In a desirable arrangement, the elastic rings have a combined sealing and spacing function.

According to several prior arrangements, of which U.S. Pat. No. 3,303,719 is representative, the sealing and spacing rings are located at juncture of the inertia member carrying portion of the mounting disk and axially extending flanges on the disk between the carrying portion and the hub portion. Such an arrangement affords little, if any, tuning advantage from the elastic rings.

As is well disclosed in U.S. Pat. No. 2,636,399, for example, an objectionable torsional vibration may occur at some speed within the normal operating speed range for the mass elastic system being damped; and to overcome this it is desirable to connect the damper inertia mass to the hub by means of rubber or rubber-like tuning spring means in such a fashion that the frequency of the spring and inertia mass is a certain percentage of the natural frequency of the entire mass elastic system, thereby providing a counteracting force which gives the damper hub and inertia mass significantly more relative movement than they would have without the tuning spring. Since the amount of friction work that can be done by the viscous damping elements and by the elastic tuning spring means is a function of the relative amplitude, dampers using the tuning spring means are capable of transforming more torsional vibratory energy into heat energy are thus capable of reducing the torsional vibration amplitudes of the system to lower levels. This desirable effect is contingent upon being able to obtain the proper dimensions and location of the elastic spring means. In the forms of the damper shown in U.S. Pat. No. 2,636,399, the elastic tuning rings are enclosed within the working chamber in which the inertia mass is housed.

A damper arrangement of the inertia ring carried on a mounting disk type which can attain at least some tuning advantage from the greater resistance to shear of elastic bodies as compared to viscous damping medium alone is disclosed in U.S. Pat. No. 3,410,369. However, serious deficiencies in that disclosure are the difficulty in attaining concentricity of the elastic rings, and exposure of the rings to dirt and contaminants. In the examples disclosed in U.S. Pat. No. 3,410,369, the radially inner sides of the elastic rings are uncontrolled so that during assembly of the dampers the rings are liable to eccentric misplacement. There is complete exposure of the radially inner sides of the tuning rings to dirt and contaminants.

It is, therefore, an important object of the present invention to overcome the disadvantages, deficiencies, inefficiencies, shortcomings and problems presented by prior constructions, and to provide new and improved tuned viscous damper constructions which will efficiently meet tuning requirements in a basically torsional viscous damper of the kind having the inertia mass supported on mounting disk means.

Another object of the invention is to provide a new and improved method of making a tuned torsional viscous damper in which the structural relationships are such as to assure efficient tuning.

A further object of the invention is to provide a new and improved method for assuring substantially accurate, efficient, balanced tuning by means of elastic, i.e., rubber including elastomeric, tuning spring rings in torsional viscous dampers.

Still another object of the invention is to provide new and improved method of effecting structural relationships in torsional viscous vibration dampers of the kind in which an inertia ring is supported on a combined damper disk and attaching hub member.

According to features of the invention, there is provided a method of making a tuned viscous torsional vibration damper, comprising assembling preformed elastic tuning spring, spacing and sealing rings in engagement about concentricity maintaining shoulder means of substantially the same diameter as the radially inner diameter of the rings and located at the radially inner sides of grooves substantially wider than the rings within radially inner portions of confronting spaced axially directed faces within a ring shaped inertia mass having a radially inwardly opening annular working chamber; mounting the inertia mass on a supporting disk, including placing within said working chamber and between the rings a radially extending body on said supporting disk, with parallel confronting working surfaces on the body and on said faces in shear film spaced relation having regard to the viscosity of damping medium to be filled into the chamber; bonding the elastic rings to the body and to the inertia mass, and filling viscous damping medium into the chamber. The elastic rings are desirably placed under axial conpression between the body and the inertia mass in the grooves and the rings expanded radially outwardly under the compression and because the rings are held against radially inward displacement by said concentricity maintaining shoulder means.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 1 is a vertical longitudinal sectional detail view showing a representative construction in a preferred embodiment of damper made in accordance with the method of the present invention;

FIG. 2 is an exploded assembly view of the embodiment of FIG. 1; and helpful in understanding the method of making tuned viscous torsional vibration dampers according to the present invention;

FIG. 3 is an enlarged fragmentary detail view of the tuning spring ring area of the embodiment of FIG. 1; and FIGS. 4 to 8, inclusive, respectively show various modifications in the damper of the present invention.

In the tuned rubber viscous torsional vibration damper 25, as shown in FIG. 1, a supporting disk member 27 may comprise a flat annular disk of suitable thickness having a radially inner hub portion 28 provided with means such as bolt holes 29 to facilitate mounting of the disks in concentric corotational relation on a rotary structure such as a crankshaft. Extending integrally radially outwardly relative to the hub portion 28 of the disk 27 is a circular body portion 30 which is received within a radially inwardly opening annular working chamber 31 defined within a ring shaped inertia mass 32. Within the working chamber 31, the body portion 30 has an axially facing working surface 33 in spaced parallel relation to a working surface 34 of the inertia mass, and an oppositely axially facing working surface 35 of the body is in spaced parallel relation to a confronting axially facing working surface 37 of the inertia mass. At its perimeter, the body 30 may have an annular radially outwardly facing working surface 38 in parallel relation to an annular radially inwardly facing working surface 39. The spacing between the various confronting working surfaces is predetermined in respect to the viscosity of a viscous damping medium substantially filling the chamber 31 to result in shear films of the medium between the parallel confronting working surfaces, having regard to the viscosity of the damping medium. Thereby relative parallel movement between the body 30 and the inertia mass 32 is resisted by the viscous damping medium acting as a viscous coupling and any relative parallel torsional movement causes laminar shearing of the viscous medium whereby energy is dissipated and vibrations are damped. The damping medium may comprise a silicone fluid of suitable viscosity for the intended purpose.

In a desirable construction, the inertia mass 32 comprises a pair of substantially equal opposite complementary inertia ring members 40 and 41 having at their radially outer perimeters spacer flanges 42 which extend into edge-to-edge abutment and substantially accurately define the spacing between the working surfaces 34 and 37 of the inertia mass. For securing the inertia ring members 40 and 41 fixedly concentric, means comprising a securing ring 43 extends about the outer perimeters of the joined inertia rings, and the opposite margins of the ring 43 are bent as by spinning or cramping from the original diameter shown in dash outline in FIG. 1 into locking flanges 44 onto chamfered shoulder surfaces 45 on the respective inertia rings, with suitable sealing means locked by the flanges 44 into grooves 47 in the surfaces 45. This hermetically seals the radially outer perimeter of the working chamber 31 defined within the inertia mass 32.

At its radially inner perimeter, the working chamber 31 is sealed by combination elastic tuning, spacing and sealing rings 48. To provide adequate mass in the rings 48 for tuning purposes they are of substantial radial extent and axial thickness and durometer for their intended tuning function. To accommodate the rings 48, each of the inertia members 40 and 41 is provided with a groove 49 at the radially inner end of the respective working surfaces 34 and 37. As will be noted, the grooves 49 are of equal depth and width and as nearly as practicable perfectly concentric. At their radially outer limits, the grooves 49 are defined by respective axially extending shoulder wall surfaces 50 defining with the radially outer sides of the rings 48 viscous damping medium reservoir spaces communicating with the chamber 31. At their radially inner sides, the grooves 49 are defined by radially outwardly facing respective shoulder wall surfaces 51 provided by solid respective axially extending ring retaining and protective flanges 52 concentrically on the inertia ring members. By having the axially extending shoulders 51 axially aligned, and the tuning rings 48 of substantially the same inside diameter as these shoulders there is assured concentricity and optimum cooperative tuning function of both of the tuning rings. It may be observed that in implementation of their tuning and sealing spring function, the elastic rings 48 are desirably on the order of five or six times as wide as their thickness. To attain their spacing function, the elastic rings 48 are of sufficiently equal greater thickness than the depth of the grooves 49 so that the elastic rings project from the grooves across the shear film spacing gaps between the axially facing working surfaces on the body 30 and the inertia rings 40 and 41, thereby maintaining substantially accurate shear film spaced relation between the axial working surfaces. Desirable protection is provided by the flanges 51 against contaminants and dirt reaching and deteriorating or interfering with proper functioning of the spring rings 48.

By bonding of the rings to the root surfaces within the grooves 49 as well as to substantially equal areas of the body 30, the elastic rings 48 effect thorough hermetic sealing of the working chamber 31. Such bonding may be frictional by compressive pressure against the elastic rings 48 clamped and squeezed to a thinner, wider section between the inertia rings 40 and 41 and the body 30; or the bonding may be effected by means of suitable bonding or adhesive agent with or without compressive clamping pressure upon the elastomeric rings to attain a desired tuning value. In any event, the elastic rings 48 are maintained in thoroughly concentric, stabilized tuning relation to the body 30 and the inertia mass 32. As used herein, the term "elastic" means a rubber or rubberlike elastomeric material possessing the proper elasticity for the tuning function of the rings 48. At least on those surfaces exposed to the viscous damping medium fluid, the rings 48 must be inert to such fluid.

In assembling the parts of the damper 25, as demonstrated in FIG. 2, the preformed elastic rings 48 are mounted within the grooves 49 about the shoulders 51 serving as concentricity maintaining shoulder or alignment pilot means for the rings. In an uncompressed condition the rings 48 are preferably sufficiently thicker than the depths of the grooves 49, so that when the rings are placed under compression between the inertia disks 40 and 41, they will uniformly expand in the grooves toward their radially outer sides but without filling the reservoir spaces. In the uncompressed condition, the rings 48 are of substantially differentially smaller diameter at their radially outer sides than the diameter of the groove shoulders 50, and are substantially the same diameter at their radially inner sides as the shoulders 51 which they engage at the radially inner sides of the grooves 49. Thereby, the radially inner shoulders 51 provide satisfactory gauging or pilot surfaces to assure substantial concentricity of the respective elastic rings 48 in the grooves facilitating economical assembly of the damper.

Bonding of the elastic rings 48 in the assembly may be simply functional, but a suitable bonding agent 53 (FIG. 3) may secure them to the root surfaces in the respective grooves 49, and the areas of the body 30 to be engaged by the elastic rings 48 may be coated with a suitable bonding agent 54. When the rings 48 are pressed against the body 30, a thoroughly bonded relationship will be assured. By bonding the rings 48 at their axially facing surfaces to the damper components, but leaving the radially facing edges of the rings 48 free with respect to the surfaces of shoulders 50 and unbonded relative to the surfaces of the shoulders 51 excellent tuned torsional damping is attained by means of the elastic spring tuning rings without detrimental distortions at the radial perimeters of the tuning rings. Bonding of the axial surfaces of the rings 48 also assures thorough hermetic sealing of the working chamber 31.

As will be observed in FIG. 2, the bonding agent 54 is applied to substantially all of the surface areas on the body 30 to be engaged by the rings 48 after the rings are compressed and including those portions of the areas onto which the radially outer diameter portions of the rings move when the rings expand radially outwardly under compression. This assures complete bonding of all of the surfaces of the rings which engage the areas of the body 30.

Assembly of the mechanical components of the damper is completed by squeezing the inertia disks 40 and 41 together to place the elastic rings 48 under compression and causing the radially outer spacer flanges 42 to abut, sliding the securing ring 43 into position about the perimeter of the inertia ring assembly, and bending the marginal retaining flanges 44 as by spinning into locking retaining position as shown in FIG. 1. The final step in completing the damper comprises filling the working chamber 31 with viscous damping medium as by introducing the same through a filling opening 55 which after filling is sealed by means of a plug 57. It will be understood that one or more additional openings or ports similar to the filling opening 55 may be provided for evacuation of air from within the chamber 31 in the course of filling the damper.

In FIG. 4 a modification in the outer perimeter of the damper 25' is shown while the remainder of the damper may be substantially the same as the damper 25 of FIG. 1, the body 30' of the mounting disk plate being received in the working chamber 31' defined within the inertia mass ring 32' comprising the annular complementary inertia members 40' and 41' having the working chamber closure and spacer flanges 42'. In this instance, the retainer and sealing ring 43' is substantially narrower than the similar ring 43 of FIG. 1, and the sealerfilled grooves 47' and the marginal sealing margins 44' are located symmetrically adjacent to the flanges 42'.

In FIG. 5, the damper 25" is similar to the damper 25', but the inertia members 40" and 41" of the inertia ring 32" do not have peripheral spacer and closure flanges about the perimeter of the working chamber 31" within which the mounting plate disk plate body 30" is received. In this instance the retainer and sealing ring 43" has an annular spacer and closure rib 58 which extends radially inwardly between radially outwardly projecting annular engagement ribs 59 on the perimeters of the inertia members 40" and 41". The marginal generally radially inwardly turned securing flanges 44" of the ring 43" lock the flanges 59 against the axial sides of the rib 58 and close sealing material filled grooves 47".

As shown in FIG. 6, the damper 60 is much the same as the damper 25 of FIG. 1 except that the damper 60 has an inertia ring 61 of greater mass, its annular complementary component inertia members 62 and 63 are thicker and thus of greater mass than the inertia members 40 and 41 in FIG. 1. In addition, the damper 60 has a perimeter securing ring 64 which has, similarly as the corresponding ring in FIG. 5 an annular radially inwardly extending closure and spacer rib 65 for maintaining the members 62 and 63 accurately spaced to provide shear film working chamber space 67 within which circular damper plate body 68 is received, with the opposed, confronting working surfaces of the members 62 and 63 and the rib 65 and the mounting, supporting disk body 68 being in shear film spaced relation having regard to the viscosity of viscous damping medium substantially filling the working chamber 67. At its opposite margins, the ring 64 has turned locking flanges 69 securing sealing means in respective grooves 70 in the securing shoulder portions of the members 62 and 63. Adjacent their radially inner edges, the inertia members 62 and 63 have in their inner faces respective coaxially aligned substantially equal width grooves substantially the same as the grooves 49 in FIG. 1 and in which tuning, spacing and sealing elastic rings 72 are seated in bonded relation to the members 62 and 63 and the engaged areas of the disk body 68. At their radially inner sides, the grooves 71 are defined by elastic ring concentricity assuring and protective means similarly as in FIG. 1, in this instance comprising respective axially extending flanges 73 which may be originally radially inwardly extending as shown in dash outline and at a suitable point in fabrication of the damper turned into the axial orientation as shown in full outline. This may facilitate manufacturing the inertia members 62 and 63 by processes which would be complicated if the grooves 71 were to be delineated at their radially inner sides by the flanges 73 already axially oriented.

In the modification shown in FIG. 7, means are provided for substantially increasing the viscous damping capability of the damper 74. To this end inertia ring 75 which is constructed of complementary inertia members 77 and 78 has a working chamber 79 of greater width than the similar chamber in FIGS. 1 and 6. A peripheral securing ring 80 not only provides a sealing rim about the inertia mass 75, but also has means for increasing the working surfaces of the inertia mass with respect to a radially extending circular body 81 of supporting disk means extending into the working chamber 79. For this purpose, the rim ring 80 has not only turned marginal locking flanges 82 engaging retaining shoulders of the members 77 and 78 and securing sealing material in grooves 83, but also has an annular radially inwardly projecting central working surface flange 84 extending into the working chamber 79 between axial spacer and closure flanges 85 at the perimeter of the members 77 and 78. For shear film damping coaction with the disk body 81, the flange 84 extends into an annular radially outwardly opening goove 87 in the disk body 81 serving as an extension of the working chamber 79 and within which the confronting surfaces of the disk body and the flange 84 are in parallel shear film gap relation having regard to the viscosity of viscous damping medium in the chamber 79 and the extension groove 87, similarly as the confronting shear film spaced parallel working surfaces of the members 77 and 78 and the disk 81 in the working chamber 79. In a preferred construction the damper disk comprises a pair of complementary coaxially joined disk plates 88 having their joined surfaces secured and hermetically sealed as by means of an O-ring, an epoxy bonding agent, or the like. Each of the plates 88 is recessed to provide one-half of the groove 87 accurately dimensioned to provide the proper shear film space gap relationship between the confronting surfaces of the disks 88 and the flange 84. Similarly, as in the previously described forms of the invention, the damper 74 has combination elastic tuning spring, spacing and sealing rings 89 bonded to the inertia members 77 and 78 within respective grooves 90 and bonded to the confronting surfaces of the plates 88, the grooves 90 being provided at their radially inner sides with flange means 90a assuring concentricity and protection of the rings.

In another form of the damper identified at 91 in FIG. 8, an annular inertia mass 92 comprises an inertia member 93 complementary to and joined with an inertia member 94 defining therebetween a viscous damping medium working chamber 95 into which extends a circular body 97 of a supporting damper plate disk 98, a shear film spaced relation between the damper members and the disk body being maintained by elastic tuning spring, spacing and sealing rings 99 bonded in grooves 100 and to the engaged areas of the disk body 97, the grooves having flange means 100a at their radially inner sides assuring concentricity and protection of the rings. In this instance, the inertia members 93 and 94 are connected together at their perimeter by means of a lateral annular flange 101 on the inertia member 94 and interengage with a radially extending rib flange 102 on the member 93 which fits against an annular gauging shoulder 103 to maintain accurately spaced relation of the inertia members 92 and 93. Means such as an integral annular locking flange 104 provided as an extension from the flange 101 secures the inertia members together, being bent, as shown, from the dash line position to the full line position for this purpose. A hermetic seal is formed by sealing means locked in a seal groove 105 by the securing flange 104. In order to increase the torsional vibration damping efficiency of the damper 91, a lateral flange 107 on the radially outer edge of the disk body 97 extends into a working chamber groove extension 108 provided in the inertia member 92, and in a similar working chamber groove extension 109 defined by and between the inertia member 93 and the flange 101. All confronting surfaces of the annular ring 107 and the inertia members in the grooves 108 and 109 are in shear film spaced relation similarly as the confronting surfaces of the inertia members and the disk body 97, the elastic rings 99 facilitating maintaining such shear film spaced relationship throughout the damper.

It will be understood that variations and modifications may be effected without departing from the spirit and scope of the novel concepts of this invention.

I claim:

1. A method of making a tuned viscous torsional vibration damper comprising:

assembling elastic tuning spring, spacing and sealing rings of substantial radial width about concentricity maintaining shoulder means of substantially the same diameter as the radially inner diameter of the rings, and located at the radially inner sides of groove recesses wider than the rings within radially inner portions of confronting spaced axially directed faces within a ring shaped inertia mass having a radially inwardly opening annular working chamber at the radially outer sides of the groove recesses and within which groove recesses said rings are engaged;

mounting the inertia mass on a circular flat supporting disk having a radially inner hub portion and a radially outwardly extending body, including placing said body within said working chamber and between said rings, with parallel confronting working surfaces on the body and on said faces in shear film spaced relation having regard to the viscosity of damping medium to be filled into the chamber;

compressing said elastic rings axially between opposed surface areas of said body and opposed surface areas of said inertia mass and by means of said shoulder means holding said rings against spreading radially inwardly while expanding the elastic rings radially outwardly under compression, but leaving annular space about the radially outer sides of the elastic rings and thereby preventing contact of the radially outer diameters of the rings with any surface at the radially outer diameters of said groove recesses;

bonding of the surfaces of contact of said compressed elastic rings to said body and to said inertia mass; and filling viscous damping medium into said chamber.

2. A method according to claim 1, comprising, before compressing said rings applying bonding agent to substantially all of the surface areas on said body to be engaged by said rings after the rings are compressed and including those portions of the areas onto which the radially outer diameter portions of the rings move when the rings expand radially outwardly under compression, whereby to assure complete bonding of all surfaces of the rings which engage said areas.

3. In a method of making a tuned viscous torsional vibration damper assembly of the type having supporting disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having in its radially inner portion concentric annular grooves of substantial width at opposite sides of and facing axially toward said body contiguous to the opening from said chamber, with elastic tuning spring, spacing and sealing rings coupling opposing surface areas of said inertia mass in said grooves and opposing surface areas on said body, the improvement comprising:

assembling said rings in said grooves with the radially inner diameters of the rings adjacent to the radially inner diameters of said grooves and the radially outer diameters of the rings spaced from the radially outer diameters of the grooves;

providing concentricity maintaining shoulder means across the radially inner diameters of said grooves and in engagement with the radially inner diameters of the rings;

providing said rings of an original thickness greater than the ultimate spacing between said opposing surface areas to which the rings are coupled, and with the radially outer diameters of the rings less than the radially outer diameters of said grooves;

compressing said elastic rings axially between said opposing surface areas of said inertia mass in said grooves and said opposing surface areas on said body and by means of said shoulder means holding said rings against spreading radially inwardly, while expanding the elastic rings radially outwardly under compression, but leaving annular space about the radially outer diameters of the rings and thereby preventing contact of the radially outer diameters of the rings with any surfaces at the radially outer diameters of the grooves;

and effecting compressed bonding of the surfaces of contact of said rings to said opposing surface areas of said inertia mass and of said body.

4. A method according to claim 3, wherein said inertia mass comprises a pair of separately formed inertia members and said elastic rings are preformed, comprising assembling the inertia members and said rings and said disk means body in proper concentric orientation and with said rings engaged at their inner diameters with said shoulder means, and engaging spacer means between said inertia members at the radially outer side of said working chamber and thereby maintaining the inertia members in spaced relation to define said working chamber between the members.

5. A method according to claim 3, wherein said inertia mass comprises complementary annular inertia members, comprising engaging ring means about the outer perimeters of the inertia members and thereby securing the inertia members together, and inserting between the inertia members an inward annular projection from the ring means.

6. A method according to claim 5, comprising extending said projection into a groove in said body of the supporting disk means body and thereby placing confronting parallel working surfaces of the extension and of the body within the groove in shear film spaced relation having regard to the viscosity of the damping medium.

7. A method according to claim 6, comprising building up said disk means body from a pair of disk plates in laminar relation and defining therebetween said groove into which said extension projects.

8. A method according to claim 3, comprising projecting axially extending flange means on said body of the disk means into an axially extending groove extension from said working chamber into said inertia mass, and placing confronting surfaces of said flange means and of said inertia mass in said groove extension into shear film spaced relation having regard to the viscosity of the damping medium.

9. A method according to claim 8, comprising attaching a ring member to said circular body to provide said axially extending flange means.

10. A method according to claim 3, comprising, before compressing said rings applying bonding agent to substantially all of the surface areas on said body to be engaged by said rings after the rings are compressed and including those portions of the areas onto which the radially outer diameter portions of the rings move when the rings expand radially outwardly under compression, whereby to assure complete bonding of all of the surfaces of the rings which engage said areas.

* * * * *